United States Patent Office 3,029,206
Patented Apr. 10, 1962

3,029,206
COMPOSITIONS OF CHLOROSUBSTITUTED BENZOYL PEROXIDE
James B. Harrison, Eggertsville, and Orville L. Mageli, Grand Island, N.Y., assignors to Wallace & Tiernan Incorporated, Newark, N.J.
No Drawing. Filed Apr. 29, 1959, Ser. No. 809,618
8 Claims. (Cl. 252—426)

The present invention relates to a method of preparing a dispersion of 2,4-dichlorobenzoyl peroxide in and with a high boiling hydrocarbon liquid, and to the composition thereby produced.

At the present time, of the organic peroxides available for polymerization of elastomers of the so-called silicone type, it has been found that a special virtue resides in the employment of 2,4-dichlorobenzoyl peroxide, and to a lesser degree, benzoyl peroxide itself, as the polymerization catalyst in systems containing the so-called silicone gums, that is, materials which in a general way may conform to the following class formula:

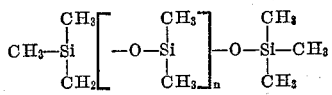

where $n$ may vary from 0 to 2000 or more.

As indicated, the halogen substituted benzoyl peroxide, namely, 2,4-dichlorobenzoyl peroxide, has found greatest commercial applicability as a curing or vulcanizing agent for such elastomers and the discussion herein will be directed particularly to the preparation of a suitable composition of 2,4-dischlorobenzoyl peroxide for this purpose and to the resulting composition.

The specified halogen substituted benzoyl peroxide is shock-sensitive in contrast with the parent nonhalogenated benzoyl peroxide so that special procedures in manufacturing, handling, storage and shipment, must be provided in connection with 2,4-dichloribenzoyl peroxide.

It is an object of the present invention therefore to provide a procedure for preparing a nonshock-sensitive composition containing a di-(aromatic acyl) peroxide and particularly one containing 2,4-dichlorobenzoyl peroxide.

In the broad aspects of the present invention the di-(aromatic acyl) peroxide, 2,4-dichlorobenzoyl peroxide is prepared by suitable reaction of an aqueous solution of hydrogen peroxide made alkaline with a suitable hydroxide wherein the hydroxyl may be provided by any of the alkali metal or alkaline earth metal hydroxides. For practical operating results, sodium peroxide in water may be prepared and reacted with the suitable acid chloride; in the specific instance, 2,4-dichlorobenzoyl chloride. The reaction appears to be relatively simple and in accordance with the equation below:

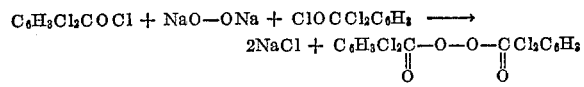

The resultant dichlorobenzoyl peroxide is not greatly soluble in water and when the reaction is performed in aqueous medium, precipitates as a fine crystal suspension of the typical acicular crystals. In general, the average particle size of the resultant product, measured along the axis of greatest length, does not exceed about 40 microns and is generally in the range 1 micron, or less, to 40 microns, with a great proportion of the crystals being in the size range about 5 to 15 microns. The sludge can be filtered and dried, as for instance with air.

Such resultant product is extremely shock-sensitive and therefore cannot be shipped by common carrier. Furthermore, on standing, a small proportion of the crystals either grows in size or agglomerates and remains as agglomerates, clusters or large crystals and, in ultimate use as a curing or vulcanizing agent for the so-called silicone gums, produces non-uniformity in the final vulcanized gum. Such non-uniformity manifests itself by the presence in the final vulcanized product of voids known in the trade as "blow holes."

In accordance with the broad aspect of the present invention, prior to the time the fine crystals have opportunity to undergo crystal growth or before agglomeration proceeds to any great degree, the solid, finely divided dichlorobenzoyl peroxide is transformed from an aqueous suspension to a suspension of the fine crystals in a high boiling point hydrocarbon relatively immiscible with water. The hydrocarbon chosen and preferred is of the aliphatic type known as petrolatum and liquid petroleum, that is, the refined product, either oil or jelly, having a density in the range from 0.82 to 0.91.

This transfer of the crystals from aqueous environment is preferably effected by agitating the petrolatum with the dichlorobenzoyl peroxide crystals. The agitation should be of such nature as to provide relatively intimate contact of the petrolatum with the aqueous suspension and, for practical plant operations, any suitable milling operation may be employed, as for instance, passage through rolls, ball milling, passage through colloid mill or the employment of ultrasonic mixing techniques; for general plant operations, however, normal milling will be sufficient. During such milling operation there is a gradual transfer of crystals to the hydrocarbon and suspension of the crystals therein. Where such milling is performed upon crystals of the peroxide that are moistened with water, an aqueous phase relatively free of crystals forms and can be then separated from the petrolatum.

The resultant disperson of crystals of the 2,4-dichlorobenzoyl peroxide in the hydrocarbon can be thoroughly dried in any suitable fashion as by vacuum drying or by the passage of a dry inert gas therethrough. The crystals in a relatively water-free environment maintain their initial size and uniformity of size distribution in what may be called the oil phase.

It will be understood that a variation in the procedure for the manufacture of 2,4-dichlorobenzoyl peroxide, as outlined above, may be made in that the petrolatum may be initially present in the aqueous reaction environment. In order to reduce the time and cost of drying under such circumstances, it is suggested that a portion of the total petrolatum ultimately to be employed with the amount of 2,4-dichlorobenzoyl peroxide produced, be added to the aqueous reaction environment and, after formation of 2,4-dichlorobenzoyl peroxide, the mixture of oil and moistened crystals be separated. The separated mixture of oil, water and crystals may be then milled with an additional amount of hydrocarbon oil to produce the desired concentration of the peroxide therein.

As a specific example, there was prepared by reaction of sodium peroxide and 2,4-dichlorobenzoyl chloride, as indicated above, a dispersion in mineral oil having an active oxygen content of 1.67% which was equivalent to approximately 40% 2,4-dichlorobenzoyl peroxide and 50% mineral oil.

When observed under the microscope, the particle size of the 2,4-dichlorobenzoyl peroxide was within the range 1 to 5 microns, was substantially free of agglomerates and of large crystals and this condition persisted with time.

An examination of the crystal size after a period of three months indicated that there had been no significant growth in the size of the crystals, nor of their distribution and classification, and there was no production of agglomerates or clusters.

The value of this product was further demonstrated by employment thereof as a vulcanizing agent in the vulcanizing of silicone gums, which resultant vulcanized products were free of voids and blow holes.

As an additional variation of the invention, other specific additives may be included with the mineral oil as a substitute for a part thereof in the mineral oil-peroxide composition and where such composition is to be used specifically for the vulcanization of silicone gums there may be added a desirable quantity of so-called silicone oil. This product is suggested as an additive by reason of compatibility in the ultimate vulcanized silicone gum system. The silicone oil or fluid may be added at any desirable point in the processing, as for instance to the aqueous reaction mixture of sodium peroxide and 2,4-dichlorobenzoyl chloride, or at the time of any milling operation. It must be kept in mind that any additive included in the mineral oil-peroxide mixture must be of such type as not to favor crystal growth. Relative insolubility of 2,4-dichlorobenzoyl peroxide in such additive is, therefore, a necessary factor.

There has been illustrated above, specifically, the preparation of a dispersion of finely divided 2,4-dichlorobenzoyl peroxide in mineral oil wherein the mineral oil is present in an amount of approximately 60% by weight of the finish product. It will be understood however that suitable and commercially desirable dispersions may be prepared containing less than 40% of 2,4-dichlorobenzoyl peroxide, as for instance 25%, and it is possible to prepare a mineral oil-peroxide composition with so great a content of the peroxide as to constitute 95% by weight of the final mineral oil-peroxide composition.

To summarize, the peroxide may constitute from 25% to 95% of the paste; the mineral oil in the paste from 75% to so low as 5% by weight of the final product.

For the special purpose and use indicated above, silicone fluid may be used in such quantity as to replace a very considerable part of the mineral oil, as for instance, 95% thereof, or may replace the mineral oil in whole or in part.

Under such circumstances the small amount of mineral oil required may be added to the reaction environment and the silicone fluid subsequently milled with the oil-peroxide paste.

What is claimed is:

1. The method of preparing a paste of 2,4-dichlorobenzoyl peroxide which comprises reacting an aqueous alkaline hydrogen peroxide by contact with 2,4-dichlorobenzoyl chloride until finely divided crystals of 2,4-dichlorobenzoyl peroxide are produced and before such crystals have opportunity to grow in size in the aqueous environment, milling the mixture of water and crystals with petrolatum whereby a substantially water-free paste of the peroxide crystals in petrolatum is produced.

2. A substantially water-free paste of petrolatum containing very finely divided and substantially nonagglomerated crystals of 2,4-dichlorobenzoyl peroxide prepared in accordance with claim 1.

3. The method of preparing a paste of 2,4-dichlorobenzoyl peroxide which comprises reacting aqueous sodium peroxide by contact with 2,4-dichlorobenzoyl chloride until finely divided crystals of 2,4-dichlorobenzoyl peroxide are produced and before such crystals have opportunity to grow in size in the aqueous environment, milling the mixture of water and crystals with petrolatum whereby a paste of the peroxide crystals in petroleum is produced, and eliminating water from the paste.

4. The method of preparing a paste of 2,4-dichlorobenzoyl peroxide which comprises reacting in aqueous medium sodium peroxide and 2,4-dichlorobenzoyl chloride until finely divided crystals of 2,4-dichlorobenzoyl peroxide are produced and then milling the mixture of water and crystals so produced with petrolatum to produce a paste of the peroxide crystals in petrolatum.

5. The method of preparing a paste of 2,4-dichlorobenzoyl peroxide which comprises reacting in aqueous medium sodium peroxide and 2,4-dichlorobenzoyl chloride until finely divided crystals of 2,4-dichlorobenzoyl peroxide are produced and then milling such crystals with petrolatum and silicone fluid to produce a paste of the peroxide crystals in the petrolatum and silicone fluid.

6. A paste of 2,4-dichlorobenzoyl peroxide and petrolatum which is essentially water-free and wherein the petrolatum constitutes 5% to 75% by weight of the paste.

7. A paste in accordance with claim 6 wherein a portion of the petrolatum up to 95% is replaced by silicone fluid.

8. The method of preparing a paste of a 2,4-dichlorobenzoyl peroxide which comprises reacting sodium peroxide and 2,4-dichlorobenzoyl chloride in the presence of water and petrolatum until finely divided crystals of 2,4-dichlorobenzoyl peroxide are produced and then milling the resultant reaction mixture with additional petrolatum until a substantially water-free paste of crystals of the 2,4-dichlorobenzoyl peroxide in petrolatum is produced.

References Cited in the file of this patent

UNITED STATES PATENTS

| | | |
|---|---|---|
| 2,838,472 | Lucas | June 10, 1958 |
| 2,858,280 | Maltha | Oct. 28, 1958 |
| 2,910,443 | Bader | Oct. 27, 1959 |

UNITED STATES PATENT OFFICE
CERTIFICATE OF CORRECTION

Patent No. 3,029,206                      April 10, 1962

James B. Harrison et al.

It is hereby certified that error appears in the above numbered patent requiring correction and that the said Letters Patent should read as corrected below.

Column 1, lines 21 to 25, the formula should appear as shown below instead of as in the patent:

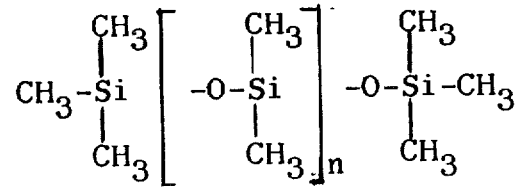

column 3, line 25, for "finish" read -- finished --.

Signed and sealed this 4th day of September 1962.

(SEAL)
Attest:

ERNEST W. SWIDER                      DAVID L. LADD

Attesting Officer                      Commissioner of Patents